(12) United States Patent
Lacey et al.

(10) Patent No.: US 8,235,748 B2
(45) Date of Patent: **\*Aug. 7, 2012**

(54) EXTERNAL QUICK CONNECT MODULAR PLUG FOR A WIRING DEVICE

(75) Inventors: Darron Kirby Lacey, Peachtree City, GA (US); Erik Jeffrey Gouhl, Fayetteville, GA (US); Kejie Chen, Shanghai (CN); Chuan Chuan Zhuang, Shanghai (CN); Jim A. Vaccaro, Peachtree City, GA (US); Denis Pierre Chardac, Peachtree City, GA (US); Rajesh D. Patel, Sugar Land, TX (US)

(73) Assignee: Cooper Technologies Company, Houston, TX (US)

( * ) Notice: Subject to any disclaimer, the term of this patent is extended or adjusted under 35 U.S.C. 154(b) by 257 days.

This patent is subject to a terminal disclaimer.

(21) Appl. No.: 12/627,487

(22) Filed: Nov. 30, 2009
(Under 37 CFR 1.47)

(65) Prior Publication Data
US 2011/0130015 A1    Jun. 2, 2011

(51) Int. Cl.
*H01R 13/60* (2006.01)
(52) U.S. Cl. ......... 439/535; 439/502; 439/505; 439/536
(58) Field of Classification Search ............... 439/502, 439/535, 536, 505
See application file for complete search history.

(56) References Cited

U.S. PATENT DOCUMENTS

| | | | |
|---|---|---|---|
| 3,192,499 A | 6/1965 | West | |
| 3,325,769 A | 6/1967 | Travis | |
| D210,533 S | 3/1968 | Pauza | |
| 3,641,472 A * | 2/1972 | Phillips, Jr. | 439/34 |
| 4,593,960 A | 6/1986 | Millhimes et al. | |
| 4,725,249 A | 2/1988 | Blackwood et al. | |
| 4,756,695 A | 7/1988 | Lane et al. | |
| 4,842,551 A | 6/1989 | Heimann | |
| 4,990,094 A | 2/1991 | Chandler et al. | |
| 5,125,854 A | 6/1992 | Bassler et al. | |
| 5,178,555 A | 1/1993 | Kilpatrick et al. | |
| 5,480,319 A * | 1/1996 | Vlakancic | 439/347 |
| D425,869 S | 5/2000 | Yokomizo et al. | |
| 6,102,733 A | 8/2000 | Anderson, Jr. et al. | |
| 6,152,608 A * | 11/2000 | Ghara et al. | 385/60 |
| D479,199 S | 9/2003 | Jones et al. | |
| 6,932,624 B1 | 8/2005 | Hoopes et al. | |
| 7,052,313 B2 | 5/2006 | Gorman | |
| 7,122,738 B2 | 10/2006 | Kanamaru | |
| D531,959 S | 11/2006 | Kondas | |
| D531,960 S | 11/2006 | Kondas | |
| 7,160,147 B1 * | 1/2007 | Stephan | 439/535 |
| 7,195,517 B1 | 3/2007 | Savicki | |
| 7,258,566 B2 * | 8/2007 | Koenig et al. | 439/353 |

(Continued)

*Primary Examiner* — Tho D Ta
(74) *Attorney, Agent, or Firm* — King & Spalding LLP (57) ABSTRACT

The modular electrical wiring device includes an electrical wiring device and an external plug that is electrically coupled by one or more wires to the wiring device. The modular plug is releasably coupled to a connector in a male-female relationship. Both the modular plug and connector include internal contacts for electrically coupling one to the other. The connector is electrically coupled to and directly terminates one or more building wires, which are used to provide power to one or more of the wiring devices. The external plug is removably coupled to the connector to provide electrical power to the wiring device by establishing and electrical pathway from a source of electrical power, through the building wires, the connector and the modular plug to the wiring device.

20 Claims, 4 Drawing Sheets

U.S. PATENT DOCUMENTS

| | | |
|---|---|---|
| 7,322,857 B2 | 1/2008 | Chen |
| 7,344,392 B2 * | 3/2008 | Rubin et al. ................. 439/108 |
| D574,773 S | 8/2008 | Sutter |
| D581,366 S | 11/2008 | Knepper |
| 7,510,429 B1 | 3/2009 | Savicki et al. |
| D609,191 S | 2/2010 | Feldvoss et al. |
| 7,762,836 B2 | 7/2010 | Rubin et al. |
| 7,837,491 B2 * | 11/2010 | Collin ........................ 439/317 |
| 7,851,704 B2 | 12/2010 | Fitch et al. |
| 7,867,038 B2 * | 1/2011 | Hariharesan et al. ......... 439/679 |
| 7,887,363 B1 * | 2/2011 | Weeks et al. ................. 439/535 |
| 8,113,874 B2 * | 2/2012 | Lacey et al. .................. 439/535 |
| 2004/0214464 A1 | 10/2004 | Fukushima et al. |
| 2008/0020632 A1 | 1/2008 | Gorman |

* cited by examiner

EXTERNAL QUICK CONNECT MODULAR PLUG FOR A WIRING DEVICE

CROSS-REFERENCE TO RELATED APPLICATIONS

This application is related to U.S. patent application Ser. No. 12/627,469, entitled "External Quick Connect Modular Plug For A Wiring Device," filed Nov. 30, 2009, the entirety of which is incorporated herein by reference.

TECHNICAL FIELD

The present invention relates generally to electrical installation and maintenance. More specifically, the present invention relates to the installation and maintenance of electrical wiring devices that include an external plug for quick connection to in-wall wiring.

BACKGROUND

Installing electrical wiring and electrical wiring devices, including, but not limited to, receptacles, switches, transient voltage surge suppressors (TVSS), ground fault circuit interrupters (GFCI), thermostats, timer devices, and sensors and the like, in buildings is very labor intensive. Skilled electricians are often needed to complete the installation. For large scale installations, the need for skilled electricians results in a significant financial outlay.

The installation process is typically split into two phases, a "rough-in phase" and a "trim-out phase." During rough-in, electrical wiring is routed throughout the building. Device boxes are installed at various points in the building. These device boxes house one or more types of electrical wiring devices. For conventional wiring installations, the electrical wiring is routed through an opening formed in the device box, making the wire leads visible and accessible for the trim-out portion of the project.

During trim-out, an electrical wiring device is coupled to the exposed wire leads in the device box. In conventional electrical installations, the wire leads are stripped to expose the conductive electrical wires. The electrical wiring device is then electrically coupled to the stripped wire leads using a jumper, such that one end of the jumper is electrically coupled to the exposed wire leads forming a pigtail connection and the other end of the jumper is terminated to the electrical wiring device using a twist-on wire connector. During this process, each exposed wire lead must be electrically coupled to the electrical wiring device in this manner. Typically this means a hot wire conductor is coupled to a hot wire contact for the electrical wiring device, a neutral wire conductor is coupled to a neutral wire contact for the electrical wiring device, and a ground wire conductor is coupled to a ground wire contact for the electrical wiring device. Those of ordinary skill in the art will recognize that, while one example has been provided for the wire connections completed during the rough-in and trim-out phases, other wiring designs exist based on the electrical design for the building and user preferences. For example, the electrical wiring and the devices connected thereto can be configured to transmit three-phase power.

Following proper procedures, when work is being conducted on the electrical wiring device, whether it be during installation, maintenance, or preventative maintenance, the power should be turned off at the circuit breaker box to ensure that the exposed conductive electrical wires and the contacts disposed on the electrical wiring device are not live. However, proper procedures are not always followed and the power is not always turned off, thereby creating a hazardous environment for the person that is replacing and/or maintaining the electrical wiring device. This could be due to lack of care or the fact that the person performing the electrical work does not know which circuit breaker should be turned off.

SUMMARY

According to another exemplary embodiment, an electrical wiring system can include a modular electrical wiring device and a connector. The modular electrical wiring device can include an electrical wiring device, an external plug, and at least one electrical wire. The electrical wire can have a first end and a second end. The first end of the electrical wire can be coupled to the wiring device and the second end of the wire can be coupled to the external plug. The electrical wire can provide an electrical pathway between the electrical wiring device and the external plug. The connector can be electrically coupled to at least one building electrical wire. The building electrical wire can transmits power from a power source to the connector. The connector can be physically coupled to the external plug. This physical coupling of the connector and modular plug can create an electrical pathway from the building wire through the connector, modular plug and electrical wire to the electrical wiring device.

According to yet another exemplary embodiment, a method for installing electrical wiring can include installing at least one building electrical wire. The building wire can be electrically coupled to a connector. The connection between the building wire and the connector can be achieved by providing the connector with one or more electrical wires that a coupled to the connector. The method can further include providing a modular electrical wiring device having an electrical wiring device, the external plug, and at least one electrical wire. The connector can be coupled to the external plug. The electrical wire can have a first end and a second end. The first end of the electrical wire can be coupled to the wiring device and the second end of the wire can be coupled to the external plug. The electrical wire can provide an electrical pathway between the electrical wiring device and the external plug. The building electrical wire can typically be placed to extend from a first location to an electrical wiring device location.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the present invention and the advantages thereof, reference is now made to the following description in conjunction with the accompanying figures in which.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements throughout the several views.

BRIEF DESCRIPTION OF EXEMPLARY EMBODIMENTS

The present invention is directed to electrical wiring devices and their installations. In particular, the application is directed to modular electrical wiring devices having an external plug and their installations. Although the description of exemplary embodiments is provided below in conjunction with a particular type of modular electrical wiring device, alternate embodiments of the invention may be applicable to other types and configurations of modular electrical wiring devices. The invention may be better understood by reading the following description of non-limiting, exemplary embodiments with reference to the attached drawings, wherein like parts of each of the figures are identified by like reference characters, and which are briefly described as follows.

Figure 1A:
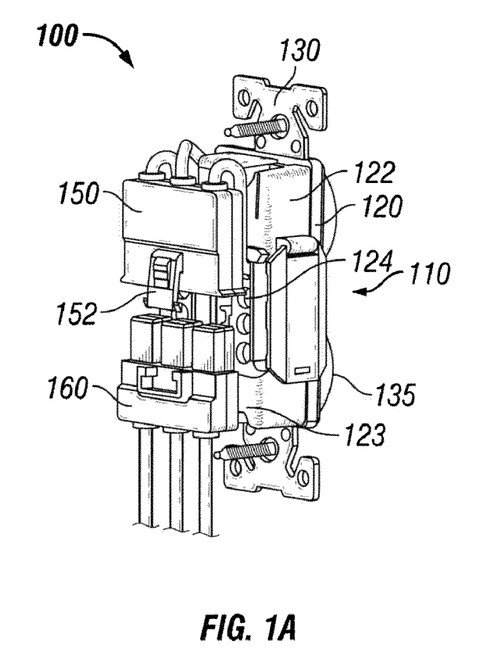
FIG. 1A is a rear perspective view of an electrical wiring system in accordance with an exemplary embodiment.
Figure 1B:
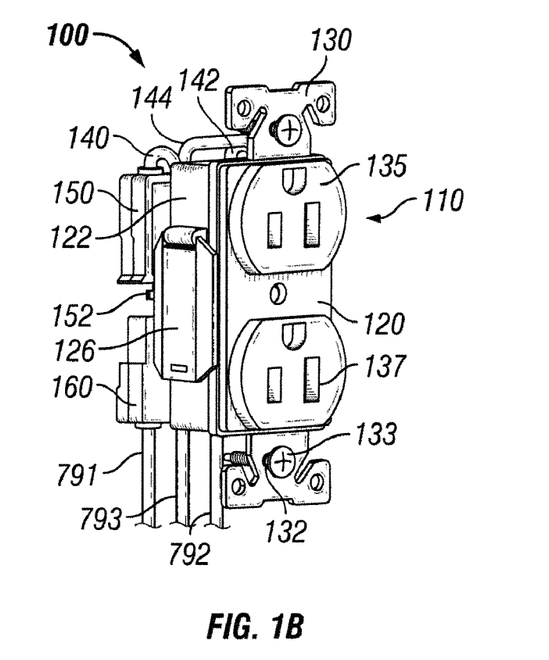
FIG. 1B is a perspective view of an electrical wiring system in accordance with an exemplary embodiment.
Figure 2:
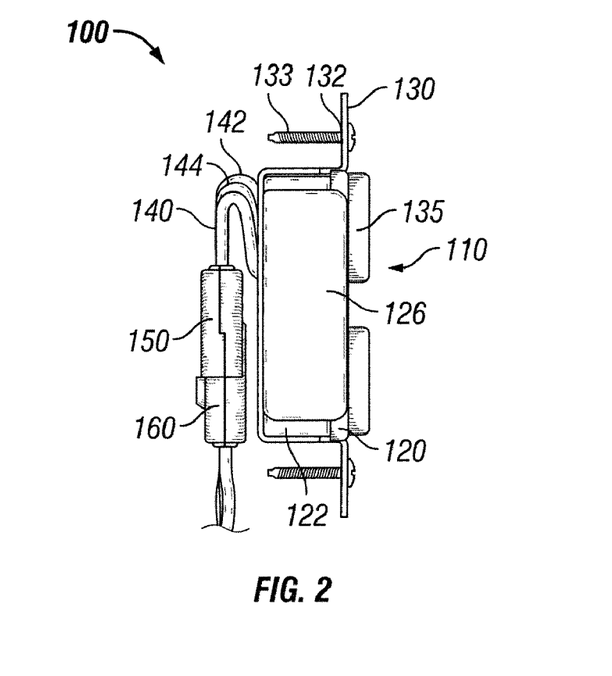
FIG. 2 is a side elevation view of the electrical wiring system of FIGS. 1A and 1B in accordance with an exemplary embodiment.

FIG. 1A is a rear perspective view of an electrical wiring system 100 that includes a modular electrical wiring device 110 and a connector 160 not yet coupled to the modular electrical wiring device 110 in accordance with an exemplary embodiment. FIG. 1B is a front perspective view of an electrical wiring system 100 that includes a modular electrical wiring device 110 and a connector 160 not yet coupled to the modular electrical wiring device 110 in accordance with an exemplary embodiment. FIG. 2 is a side elevation view of the electrical wiring system 100 of FIGS. 1A and 1B where the modular electrical wiring device 110 is coupled to the connector 160 in accordance with an exemplary embodiment. Referring to FIGS. 1A, 1B, and 2, the electrical wiring system 100 includes a modular electrical wiring device 110 that couples to a connector 160.

The modular electrical wiring device 110 includes an electrical wiring device 120 and an external plug 150 electrically coupled to the electrical wiring device 120. According to this exemplary embodiment, the electrical wiring device 120 is a receptacle wiring device. However, according to alternative exemplary embodiments, the electrical wiring device 120 can include other types of electrical wiring devices including, but not limited to, a switch wiring device, a TVSS wiring device, a GFCI wiring device, a thermostat wiring device, a timer wiring device, and a sensor wiring device, in lieu of the receptacle wiring device without departing from the scope and spirit of the exemplary embodiment.

Figure 7:
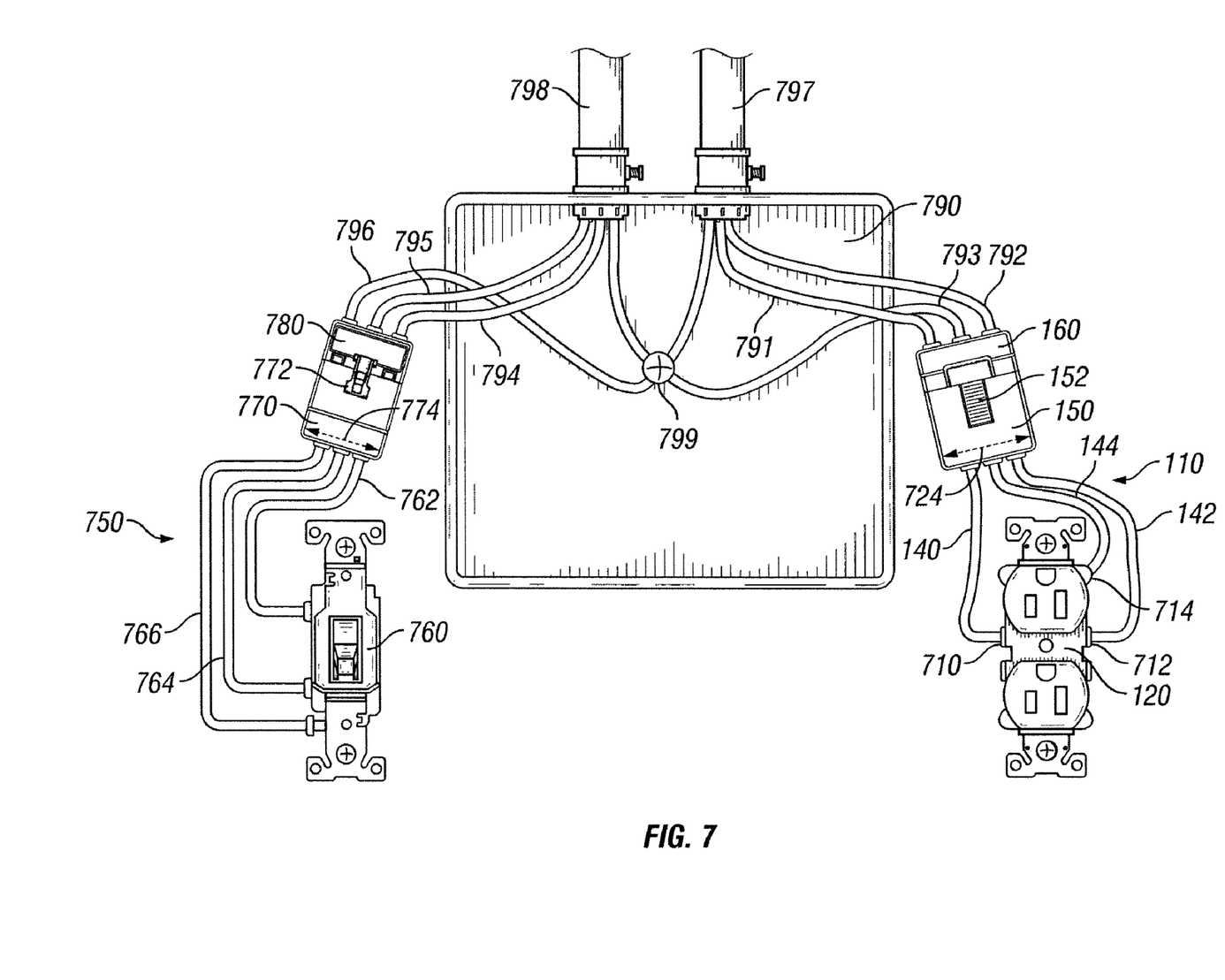
FIG. 7 is a system view illustrating two electrically installed modular electrical wiring devices in accordance with an exemplary embodiment.

The electrical wiring device 120 includes a body 122, a strap element 130, and a cover 135. The body 122 includes one or more openings 124 along the body's 122 rear side 123 and is configured to house one or more device contacts 710, 712, and 714 (FIG. 7). The exemplary embodiment shown is a three-wire system that includes a device ground contact 714, a device hot contact 710, and a device neutral contact 712. However, people having ordinary skill in the art will recognize that different wire systems, either greater than a three-wire system or less than a three-wire system, can be used. For example, a two wire system can be used. In another example, a five-wire system that uses a three-phase system also can be used. Additionally the one or more openings 124 can be positioned along the body's 122 side surfaces without departing from the scope and spirit of the exemplary embodiment.

The openings 124 are configured to allow one or more device electrical wires 140, 142, and 144 to proceed from the device contacts 710, 712, and 714 to the exterior of the electrical wiring device 120. In this exemplary embodiment, the device hot electrical wire 140 has a black colored coating surrounding the wire 140 and is coupled at one end to the device hot contact 712 and at the other end to the external plug 150. The device hot electrical wire 140 proceeds through one of the openings 124. The device neutral electrical wire 142 has a white colored coating surrounding the wire 142 and is coupled at one end to the device neutral contact 714 and at the other end to the external plug 150. The device neutral electrical wire 142 proceeds through one of the openings 124. The device ground electrical wire 144 has a green colored coating surrounding the wire 144 and is coupled at one end to the device ground contact 816 and at the other end to the external plug 150. The device ground electrical wire 144 proceeds through one of the openings 124. The color of the coatings for each of devices electrical wires 140, 142, and 144 can be changed to any other color so long as the electrical code requirements are maintained. Additionally, although the exemplary embodiment has each of the device electrical wires 140, 142, and 144 going through a separate and distinct opening 124, each of the device electrical wires 140, 142, and 144 can be grouped together so that they all proceed through a single opening 124. In those embodiments, the device electrical wires 140, 142, and 144 can be grouped together so that they are contained within a single conduit (not shown).

The device electrical wires 140, 142, and 144 are twelve American Wire Gage (AWG), but can be any other gage suitable to the application requirements without departing from the scope and spirit of the exemplary embodiment. The device electrical wires 140, 142, and 144 are fabricated from either solid copper wire, stranded copper wire, or any other suitable material known to people having ordinary skill in the art. The device electrical wires 140, 142, and 144 are coupled to their respective device contact by any method including, but not limited to, soldering that is known to people having ordinary skill in the art. Further, the device electrical wires 140, 142, and 144 have a length that is greater than zero inches, but less than six inches so that the occupied volume within the device box 790 (FIG. 7) is minimized. However, according to alternate exemplary embodiments, the length of device electrical wires 140, 142, and 144 can be greater than six inches without departing from the scope and spirit of the exemplary embodiment.

The body 122 includes an insulated door 126 positioned along one of its side surface. The insulated door 126 is configured to be rotationally opened and closed so that it provides access to conductive device contacts 710, 712, and 714 positioned on the body's 120 side surface. The insulated door 126 provides an insulative barrier to protect a user from the conductive device contacts 710, 712, and 714 when in its closed position. The insulated door 126 also provides a barrier to protect the conductive device contacts 710, 712, and 714 from nearby dust and sheetrock powder when in its closed position. According to alternative exemplary embodiments, the insulated door 126 can be a sliding door without departing from the scope and spirit of the exemplary embodiment.

The body 122 is substantially rectangular in shape; however, the body 122 can be formed in any geometric shape without departing from the scope and spirit of the exemplary embodiment. The body 122 is fabricated using materials such as polymers, polycarbonates, nylon materials, or any other suitable material known to people having ordinary skill in the art.

The strap element 130 is coupled to the body 122 and extends above the top side of the electrical wiring device 120 and below the bottom side of the electrical wiring device 120. The strap element 130 is used for at least mounting the modular electrical wiring device 110 to a device box 790. According to some exemplary embodiments, the strap element 130 is fabricated as a single component; however, in other exemplary embodiments, the strap element 130 is fabricated in multiple components and thereafter coupled to the electrical wiring device 120. The strap element 130 has a screw opening 132 at each end for receiving screws 133, which thereby facilitates the coupling of the modular electrical wiring device 110 to the device box 790. The strap element 130 is fabricated using a copper alloy, plated steel, or any other suitable material known to people having ordinary skill in the art.

The cover 135 is coupled to the body 122 at its front side. According to this exemplary embodiment, the cover 135 includes receptacle openings 137 configured for receiving a load plug (not shown) and hence providing power to a load (not shown). The load plug is configured to be electrically coupled with the device contacts 710, 712, and 714 when inserted into the receptacle openings 137. However, alternate exemplary embodiments can have different types of covers depending on the type of electrical wiring device 120. The cover 135 is fabricated using materials such as polymers, polycarbonates, nylon materials, or any other suitable material known to people having ordinary skill in the art.

The external plug 150 is located external to the electrical wiring device 120 but is electrically coupled to the device contacts 710, 712, and 714 positioned on or within the electrical wiring device 120. The external plug 150 is configured to be coupled with the connector 160. The external plug 150 includes a latch 152 that makes an audible sound once the external plug 150 is properly coupled to the connector 160. As previously described, the device hot electrical wire 140 is coupled at one end to the device hot contact 710 and at the other end to the external plug 150. The device neutral electrical wire 142 is coupled at one end to the device neutral contact 712 and at the other end to the external plug 150. The device ground electrical wire 144 is coupled at one end to the device ground contact 714 and at the other end to the external plug 150. The coupling of the device electrical wires 140, 142, and 144 to the external plug 150 will be described in further detail with respect to FIG. 3. The external plug 150 is fabricated using materials such as polymers, polycarbonates, nylon materials, or any other suitable material known to people having ordinary skill in the art.

The connector 160 is configured to be coupled with the external plug 150. According to one exemplary embodiment, the connector 160 includes three connector contacts 405 which are electrically and directly coupled to the building electrical wires 791, 792, and 793. The coupling of the connector contacts 405 to the building electrical wires 791, 792, and 793 will be described in further detail with respect to FIGS. 3, 4A, 4B, and 7. The connector 160 is fabricated using materials such as polymers, polycarbonates, nylon materials, or any other suitable material known to people having ordinary skill in the art.

Figure 3:
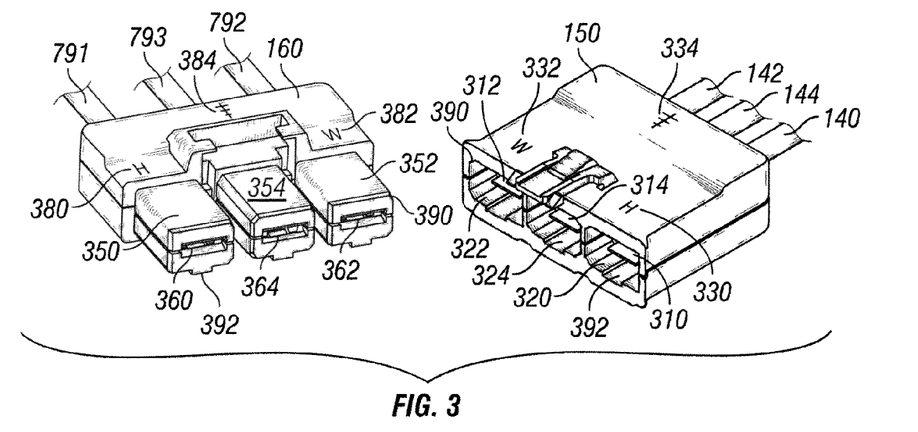
FIG. 3 is a perspective view of the external plug and connector of FIGS. 1A, 1B, and 2 in accordance with an exemplary embodiment.

FIG. 3 is a perspective view of the external plug 150 and the connector 160 of FIGS. 1A, 1B, and 2 in accordance with an exemplary embodiment. Referring to FIG. 3, the device hot electrical wire 140, the device neutral electrical wire 142, and the device ground electrical wire 144 are coupled to the external plug 150 at one end and the external plug 150 is configured to be coupled to the connector 160 at its opposing end. Similarly, the building hot electrical wire 791, the building neutral electrical wire 792, and the building ground electrical wire 793 are coupled to the connector 160 at one end and the connector 160 is configured to be coupled to the external plug 150 at its opposing end.

According to this exemplary embodiment, the external plug 150 houses three male contacts 310, 312, and 314, wherein each male contact 310, 312, and 314 is accessible through a respective male contact opening 320, 322, and 324. In this exemplary embodiment, the male contacts 310, 312, and 314 are disposed substantially horizontally with respect to the width of the external plug 150. However, in alternative exemplary embodiments, the male contacts 310, 312, and 314 can be disposed at a substantially ninety degree angle with respect to the width of the external plug 150 or at any angle between zero degrees and 180 degrees. The hot plug contact 310 is a blade contact and is electrically coupled to the device hot electrical wire 140. The neutral plug contact 312 also is a blade contact and is electrically coupled to the device neutral electrical wire 142. The ground plug contact 314 also is a blade contact and is electrically coupled to the device ground electrical wire 144. The male contacts 310, 312, and 314 can be electrically coupled to the device electrical wires 140, 142, and 144 using a screw clamp method, which is illustrated with respect to FIG. 4A, a wire push-in clamping method, which is illustrated with respect to FIG. 4B, or any other method known to people having ordinary skill in the art. The external plug 150 has one or more plug markings 330, 332, and 334 on its exterior surface to indicate which device electrical wire 140, 142, and 144 should be electrically coupled to which male contact 310, 312, and 314. According to one example, an "H" plug marking 330 is used to designate the hot plug contact 310, a "W" plug marking 332 is used to designate the neutral plug contact 312, and a ground plug marking 334 is used to designate the ground plug contact 314. These plug markings 330, 332, and 334 also assist a user to determine the orientation of how the external plug 150 is to be coupled to the connector 160. Although one example has been provided for the plug markings, the plug markings can include, but is not limited to, any letter(s), any word(s), or any symbol(s) without departing from the scope and spirit of the exemplary embodiment.

The hot plug contact 310 is accessible through the hot male contact opening 320. The neutral plug contact 312 is accessible through the neutral male contact opening 322. The ground plug contact 314 is accessible through the ground male contact opening 324. As previously mentioned, the latch 152 is configured to produce an audible signal once the external plug 150 is properly coupled to the connector 160. Additionally, a user can visibly deter mine that the external plug 150 and the connector 160 are properly coupled to one another. Although the latch 152 is used for providing a signal to indicate a properly coupled external plug 150 and connector 160, other devices capable of producing an audible and/or visible signal, for example, a light indicator on the electrical wiring device's 120 cover 135, can be used in conjunction with the latch 152 or in lieu of the latch 152 without departing from the scope and spirit of the exemplary embodiment. Although three contacts 310, 312, and 314 are illustrated within the external plug 150, greater or fewer contacts can be used without departing from the scope and spirit of the exemplary embodiment.

Figure 4A:
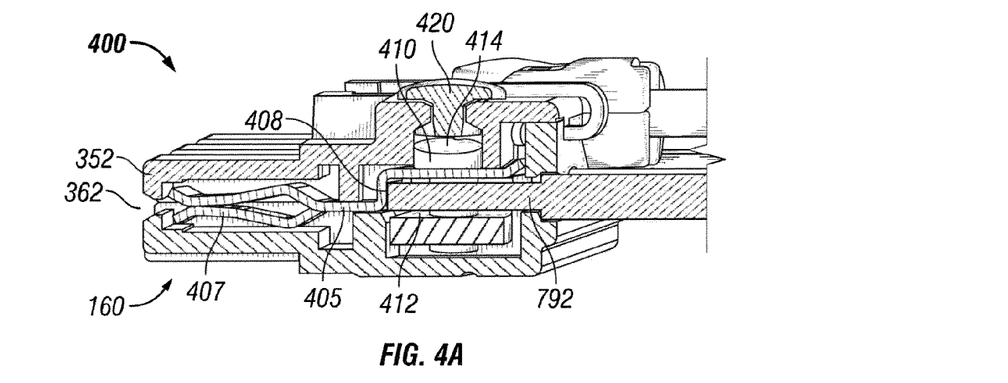
FIG. 4A is a cross-sectional view of the connector in accordance with an exemplary embodiment.

The connector 160 houses three female contacts 405 (FIG. 4A). Each of the female contacts 405 is housed at least partially within a respective connector protrusion 350, 352, and 354 located at the end of the connector 160 which is configured to be coupled with the external plug 150. The female contacts 405 are further described with respect to FIGS. 4A and 4B. The hot connector contact (not shown) is one of the female contacts and is electrically coupled to the building hot electrical wire 791. The neutral connector contact 405 is one of the other female contacts and is electrically coupled to the building neutral electrical wire 792. The ground connector contact (not shown) is the remaining female contact and is electrically coupled to the building ground electrical wire 793. The female contacts 405 can be coupled to the building electrical wires 791, 792, and 793 using a screw clamp method, which is illustrated with respect to FIG. 4A, a wire push-in clamping method, which is illustrated with respect to FIG. 4B, or any other method known to people having ordinary skill in the art. The connector 160 has one or more connector markings 380, 382, and 384 on its exterior surface to indicate which building electrical wire 791, 792, and 793 should be electrically coupled to which female contact 405. According to one example, an "H" connector marking 380 is used to designate the hot connector contact, a "W" connector marking 382 is used to designate the neutral connector contact 405, and a ground connector marking 384 is used to designate the ground connector contact. These connector markings 380, 382, and 384 also assist a user to determine the orientation of how the connector 160 is to be coupled to the external plug 150. Although one example has been provided for the connector markings, the connector markings can include, but is not limited to, any letter(s), any word(s), or any symbol(s) without departing from the scope and spirit of the exemplary embodiment. For example, markings may include references for line, load, traveler, in, and out depending on the electrical device and its intended use.

The hot connector contact is accessible through a hot female contact opening 360, which is disposed at one end of the hot contact connector protrusion 350. The neutral connector contact 405 is accessible through a neutral female contact opening 362, which is disposed at one end of the neutral contact connector protrusion 352. The ground connector contact is accessible through a ground female contact opening 364, which is disposed at one end of the ground contact connector protrusion 354. Although three contacts are described within the connector 160, greater or fewer contacts can be used without departing from the scope and spirit of the exemplary embodiment.

The hot contact connector protrusion 350 is configured to be inserted within the hot male contact opening 320. Once inserted the hot plug contact 310 is electrically coupled to the hot connector contact. The neutral contact connector protrusion 352 is configured to be inserted within the neutral male contact opening 322. Once inserted the neutral plug contact 312 is electrically coupled to the neutral connector contact 405. The ground contact connector protrusion 354 is configured to be inserted within the ground male contact opening 324. Once inserted the ground plug contact 314 is electrically coupled to the ground connector contact. The connector protrusions 350, 352, and 354 and the male contact openings 320, 322, and 324 are keyed in such a manner to allow the hot contact connector protrusion 350 to be inserted only within the hot male contact opening 320, the neutral contact connector protrusion 352 to be inserted only within the neutral male contact opening 322, and the ground contact connector protrusion 354 to be inserted only within the ground male contact opening 324. One or more chamfers 390 and/or notches 392 are used to appropriately key the connector protrusions 350, 352, and 354 and the male contact openings 320, 322, and 324 so that the connector 160 is configured to be coupled to the external plug 150 in a single orientation.

Although the external plug 150 has been described to include male contacts 310, 312, and 314 and the connector 160 has been described to include female contacts 405, the external plug 150 can have female contacts and the connector 160 can have male contacts without departing from the scope and spirit of the exemplary embodiment. Alternatively, the external plug 150 can have a combination of male and female contacts and the connector 160 can have a combination of male and female contacts, so long as each of the contacts in the external plug 150 is complementary to each of the contacts of the connector 160.

While the exemplary embodiment of FIG. 3 describes the external plug having three male contacts and three male contact openings and the connector having three female contacts and three connector protrusions, those of ordinary skill in the art will recognize the external plug and the connector are capable of being modified to include a fewer or greater number of contacts, contact openings and connector protrusions. For example, the number of contacts, contact openings and connector protrusions can range from one to twenty, based on the use of the electrical wiring device and the electrical system. One such example is a thermostat, which can include anywhere between three and ten wires, and as such, the external plug can have between three and ten male contacts and openings and the connector can have between three and ten female contacts and protrusions. In one exemplary embodiment, the electrical wiring device is a single-pole switch or timer that includes a line, load, and ground instead of a hot, neutral, and ground. The single-pole switch is coupled by a line wire, a load wire and a ground wire to the external plug. The external plug includes three openings and three male contacts: a line contact, a load contact, and a ground contact. The connector includes three protrusions and three female contacts: a connector line contact, a connector load contact and a connector ground contact.

In another exemplary embodiment, the electrical wiring device is a 3-way switch that includes a hot, two travelers, and a ground. The 3-way switch is coupled by a hot wire, a first traveler wire, a second traveler wire and a ground wire to the external plug. The external plug includes four openings and four male contacts: a hot contact, a first traveler contact, a second traveler contact, and a ground contact. The connector includes four protrusions and four female contacts: a hot connector contact, a first traveler connector contact, a second traveler connector contact, and a ground connector contact.

In yet another exemplary embodiment, the electrical wiring device is a 4-way switch that includes a first in, a second in, a first out, a second out and a ground. The 4-way switch is coupled by a first in wire, a second in wire, a first out wire, a second out wire and a ground wire to the external plug. The external plug includes five openings and five male contacts: a first in contact, a second in contact, a first out contact, a second out contact, and a ground contact. The connector includes five protrusions and five female contacts: a connector first in contact, a connector second in contact, a connector first out contact, a connector second out contact, and a connector ground contact.

FIG. 4A is a cross-sectional view of the connector 160 illustrating a screw clamp method 400 in accordance with an exemplary embodiment. Referring to FIGS. 3 and 4A, the screw clamp method 400 is illustrated and described with respect to the neutral connector contact 405 and the building neutral electrical wire 792. However, the screw clamp method 400 can be used with respect to each of the remaining contacts used within the connector 160 and/or the external plug 150.

The neutral connector contact 405 is disposed within the connector 160 and extends a substantial portion of the connector's 160 length. At one end of the neutral connector contact 405 is a three-prong female portion 407 which is configured to receive the external plug's 150 neutral plug contact 312. At the opposing end of the neutral connector contact 405 is an L-shaped portion 408 which is integrally formed with the three-prong female portion 407. The L-shaped portion 408 is configured to limit the length of building neutral electrical wire 792 that is inserted within the connector 160. The L-shaped portion 408 also is configured to receive a screw 410 so that the building neutral electrical wire 792 can be securely coupled to the L-shaped portion 408 and be electrically coupled to the three-prong female portion 407.

The screw 410 is accessible through a screw opening 414 using a screwdriver or other similar tool. The screw 410 is rotated in one direction to increase the volume of a connector wire cavity 412. A stripped portion of the building neutral electrical wire 792 is inserted within the connector wire cavity 412. The screw 410 is rotated in an opposite direction to clamp the L-shaped portion 408 to the building neutral electrical wire 792; thereby reducing the volume of the connector wire cavity 412 and ensuring a secure electrical coupling between the building neutral electrical wire 792 and the neutral connector contact 405. According to some exemplary embodiments, a screw cover 420 is coupled to the connector 160 and is configured to cover the screw opening 414 so that there is no exposed conductive surface, for example, the screw head. According to the exemplary embodiment, the screw cover 420 is non-removably coupled to the connector 160. The screw cover 420 is fabricated from a polymer material or any other insulating material known to people having ordinary skill in the art. Although one type of screw cover 420 has been illustrated and described, other types of screw covers can be used without departing from the scope and spirit of the exemplary embodiment. Additionally, although one form of the screw clamp method 400 is described and illustrated, other forms of the screw clamp method 400 known to people having ordinary skill in the art can be used without departing from the scope and spirit of the exemplary embodiment.

Figure 4B:
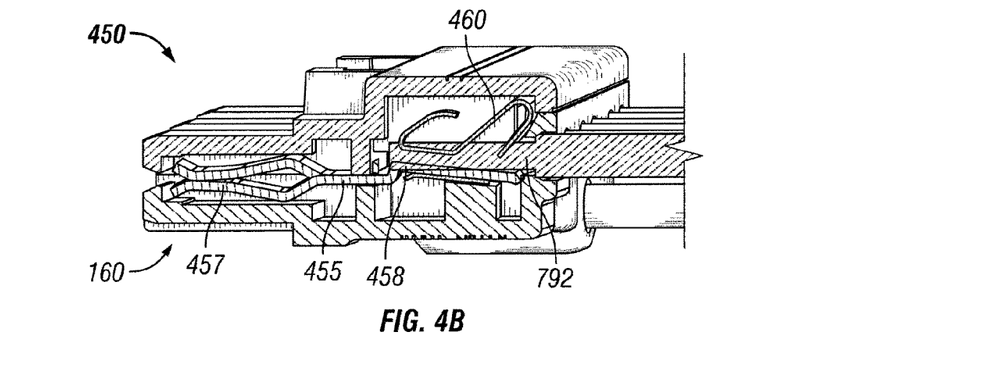
FIG. 4B is a cross-sectional view of an alternative connector in accordance with another exemplary embodiment.

FIG. 4B is a cross-sectional view of the connector 160 illustrating a wire push-in clamping method 450 in accordance with another exemplary embodiment. Referring to FIGS. 3 and 4B, the wire push-in clamping method 450 is illustrated and described with respect to the neutral connector contact 455 and the building neutral electrical wire 792. However, the wire push-in clamping method 450 can be used with respect to each of the remaining contacts used within the connector 160 and/or the external plug 150.

The neutral connector contact 455 is disposed within the connector 160 and extends a substantial portion of the connector's 160 length. At one end of the neutral connector contact 455 is a three-prong female portion 457 which is configured to receive the external plug's 150 neutral plug contact 312. At the opposing end of the neutral connector contact 455 is an L-shaped portion 458 which is integrally formed with the three-prong female portion 457. The L-shaped portion 458 is formed having an acute angle between the legs of the L-shaped portion 458.

A fastening clip 460 is disposed within the connector 160 above the L-shaped portion 458. According to this exemplary embodiment, the fastening clip 460 is S-shaped; however, other geometric or non-geometric shapes can be used for the fastening clip without departing from the scope and spirit of the exemplary embodiment. The fastening clip 460 is configured for clamping the building neutral electrical wire 792 to the neutral connector contact 455 and for securing the building neutral electrical wire 792 within the connector 160 so that the building neutral electrical wire 792 is not unintentionally removed from the connector 160. Thus, once the building neutral electrical wire 792 is coupled to the L-shaped portion 458, the building neutral electrical wire 792 also is electrically coupled to the three-prong female portion 457.

A stripped portion of the building neutral electrical wire 792 is inserted into the connector 160 between the L-shaped portion 458 and the fastening clip 460. The fastening clip 460 is configured to allow the building neutral electrical wire 792 to be easily inserted but is configured to provide added friction when the building neutral electrical wire 792 is attempted to be removed. Although one form of the wire push-in clamping method 450 is described and illustrated, other forms of the wire push-in clamping method 450 known to people having ordinary skill in the art can be used without departing from the scope and spirit of the exemplary embodiment. It also is envisioned that a combination of the screw clamp method 400 and the wire push-in clamping method 450 can be used to couple the electrical wires to the contacts within either the connector 160 and/or the external plug 150.

Figure 5:
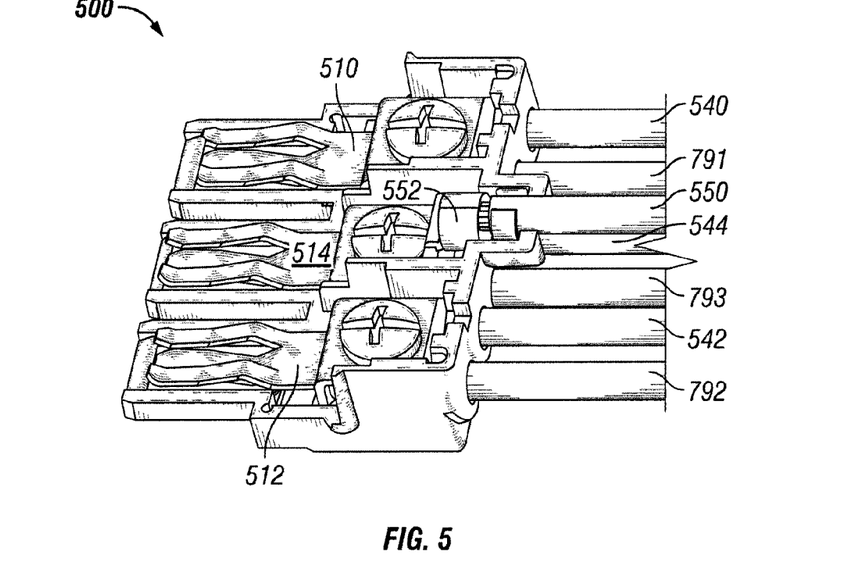
FIG. 5 is a cross-sectional view of a feed-through connector in accordance with another exemplary embodiment.

FIG. 5 is a cross-sectional view of a feed-through connector 500 in accordance with another exemplary embodiment. Referring to FIG. 5, the hot connector contact 510, the neutral connector contact 512, and the ground connector contact 514 are electrically coupled to the building hot electrical wire 791, the building neutral electrical wire 792, and the building ground electrical wire 793, respectively, at one end using the screw clamp method 400 illustrated in FIG. 4A. According to alternative exemplary embodiments, the wire push-in clamping method 450 can be used either alone or in combination with the screw clamp method 400. The feed-through connector 500 also electrically terminates one end of a feed-through hot electrical wire 540 to the hot connector contact 510, one end of a feed-through neutral electrical wire 542 to the neutral connector contact 512, and one end of a feed-through ground electrical wire 544 to the ground connector contact 514. The opposing ends of each of the feed-through hot electrical wire 540, the feed-through neutral electrical wire 542, and the feed-through ground electrical wire 544 are electrically coupled to the appropriate contacts of a downstream electrical wiring device (not shown), thereby creating a daisy-chain for providing power to multiple electrical wiring devices that are oriented in series. According to the exemplary embodiment, the external plug for one of the electrical wiring devices can be disconnected from its respective connector without disrupting the power supply to any of the remaining electrical wiring devices that are positioned on the daisy-chain configuration. This feature is accomplished because the feed-through connection occurs at the connector and remains connected when the external plug is removed from the connector. In some exemplary embodiments, a second connector ground electrical wire 550 is coupled to the ground connector contact 514 using a crimp 552.

Figure 6:
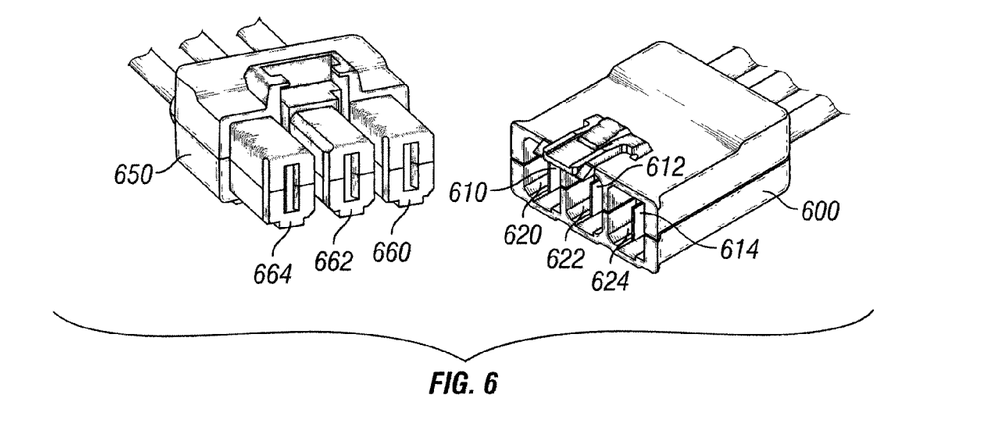
FIG. 6 is a perspective view of an alternative external plug and connector in accordance with another exemplary embodiment.

FIG. 6 is a perspective view of an external plug 600 and a connector 650 in accordance with another exemplary embodiment. The external plug 600 and the connector 650 are similar to the external plug 150 and the connector 160 of FIG. 3, except for the orientation of the male contacts 610, 612, and 614 and the male contact openings 620, 622, and 624 of the external plug 600 and the orientation of the female contacts (not shown) and the connector protrusions 660, 662, and 664 of the connector 650. Referring to FIG. 6, the male contacts 610, 612, and 614 and the male contact openings 620, 622, and 624 are disposed substantially vertically with respect to the width of the external plug 600. Similarly, the female contacts (not shown) and the connector protrusions 660, 662, and 664 are disposed substantially vertically with respect to the width of the connector 650. The connector protrusions 660, 662, and 664 are configured to be received within male contact openings 620, 622, and 624. Also, the male contacts 610, 612, and 614 are configured to be electrically coupled to the female contacts. The exemplary embodiment depicted in FIG. 6 can be used in conjunction with one type of electrical wiring device, while the exemplary embodiment depicted in FIG. 3 can be used in conjunction with another type of electrical wiring device, thereby preventing the wrong type of electrical wiring device to be electrically coupled to an improper connector type. For example, the horizontally oriented protrusions and male contact openings can be used with respect to receptacle wiring devices, while vertically oriented protrusions and male contact openings can be used with respect to switch wiring devices. Additionally, or alternatively, the dimensions of the external plug 600 and the connector 650 can be varied depending upon the type of electrical wiring device that the external plug 600 and the connector 650 will be used with.

FIG. 7 is a schematic system view illustrating two electrically installed modular electrical wiring devices 110 and 750 in accordance with an exemplary embodiment. Although one exemplary method has been illustrated for electrically installing the modular electrical devices 110 and 750, other electrical installation methods, for example, using a daisy chain installation, can be used without departing from the scope and spirit of the exemplary embodiment. Referring to FIG. 7, the modular electrical wiring device 110 is electrically coupled to building electrical wires 791, 792, 793 and the modular electrical wiring device 750 is electrically coupled to building electrical wires 794, 795, 796.

During the rough-in phase, an electrician runs building electrical wires 791, 792, 793, 794, 795, and 796 through conduits 797 and 798 and into a device box 790. According to one exemplary embodiment, a first building hot electrical wire 791, a first building neutral electrical wire 792, and a first building ground electrical wire 793 are run through a first conduit 797 and into device box 790. The first conduit 797 is coupled to the device box 790 and is configured to allow the first building hot electrical wire 791, the first building neutral electrical wire 792, and the first building ground electrical wire 793 to enter the device box 790. Similarly, a second building hot electrical wire 794, a second building neutral electrical wire 795, and a second building ground electrical wire 796 are run through a second conduit 798 and into device box 790. The second conduit 797 is coupled to the device box 790 and is configured to allow the second building hot electrical wire 794, the second building neutral electrical wire 795, and the second building ground electrical wire 796 to enter the device box 790. Although two conduits 797 and 798 are used to run building electrical wires 791, 792, 793, 794, 795, and 796, greater or fewer conduits can be used without departing from the scope and spirit of the exemplary embodiment. Additionally, although this exemplary embodiment uses a three-wire system, alternate wire systems, for example, a five-wire system and a two-wire system, can be used without departing from the scope and spirit of the exemplary embodiment.

Also during the rough-in phase, the electrician electrically couples the connectors 160 and 780 to building electrical wires 791, 792, 793, 794, 795, and 796. First connector 160 includes a first hot connector contact, a first neutral connector contact, and a first ground connector contact. The first building hot electrical wire 791, the first building neutral electrical wire 792, and the first building ground electrical wire 793 are electrically coupled to the first connector 160 according to the descriptions provided above. The coupling of the first connector 160 directly to the first building electrical wires 791, 792, and 793 allow for increased unoccupied volume within the device box 790 once the modular electrical wiring device 110 is installed to the device box 790. This allows for an easier installation process because there is more room available within the device box 790. According to one exemplary embodiment, the first building ground electrical wire 793 is routed through a screw 799 which is coupled to the device box 790.

Second connector 780 includes a second hot connector contact, a second neutral connector contact, and a second ground connector contact. The second building hot electrical wire 794, the second building neutral electrical wire 795, and the second building ground electrical wire 796 are electrically coupled to the second connector 780 according to the descriptions provided above. The coupling of the second connector 780 directly to the second building electrical wires 794, 795, and 796 allow for increased unoccupied volume within the device box 790 once the modular electrical wiring device 750 is installed to the device box 790. This allows for an easier installation process because there is more room available within the device box 790. According to one exemplary embodiment, the second building ground electrical wire 796 also is routed through the screw 799. The grounding wiring scheme shown in this exemplary embodiment is one method for grounding the ground electrical wires 793 and 796; however, alternate grounding methods can be used without departing from the scope and spirit of the exemplary embodiment.

During the trim-out stage, a non-skill electrician can be used to complete the installation of the modular electrical wiring devices 110 and 750 to lower installation costs and add more convenience to the installation process. The first modular electrical wiring device 110 includes a first electrical wiring device 120, a first external plug 150, and first device electrical wires, which include a first device hot electrical wire 140, a first device neutral electrical wire 142, and a first device ground electrical wire 144, electrically coupling the first electrical wiring device 120 to the first external plug 150. The coupling of the first device electrical wires 140, 142, and 144 from the first external plug 150 to the first electrical wiring device 120 has been previously described above. According to one exemplary embodiment, the first electrical wiring device 120 is a receptacle wiring device.

The second modular electrical wiring device 750 includes a second electrical wiring device 760, a second external plug 770, and second device electrical wires, which include a second device hot electrical wire 762, a second device neutral electrical wire 764, and a second device ground electrical wire 766, electrically coupling the second electrical device 760 to the second external plug 770. The coupling of the second device electrical wires 762, 764, and 766 from the second external plug 770 to the second electrical wiring device 760 has been previously described above. According to one exemplary embodiment, the second electrical wiring device 760 is a switch wiring device.

The first external plug 150 is coupled to the first connector 160 in a manner where the first device hot electrical wire 140 is electrically coupled to the first building hot electrical wire 191, the first device neutral electrical wire 142 is electrically coupled to the first building neutral electrical wire 192, and the first device ground electrical wire 144 is electrically coupled to the first building ground electrical wire 193. Once the first external plug 150 is properly coupled to the first connector 160, an audible signal is produced by a first latch 152, located on the first external plug 150, to notify an installer that the coupling is properly completed. As previously mentioned, the first external plug 150 and the first connector 160 are configured so that the first external plug 150 and the first connector 160 are coupled in a single orientation. This ensures that the hot wires 140 and 191, the neutral wires 142 and 192, and the ground wires 144 and 193 are properly electrically coupled to one another.

The second external plug 770 is coupled to the second connector 780 in a manner where the second device hot electrical wire 762 is electrically coupled to the second building hot electrical wire 794, the second device neutral electrical wire 764 is electrically coupled to the second building neutral electrical wire 795, and the second device ground electrical wire 766 is electrically coupled to the second building ground electrical wire 796. Once the second external plug 770 is properly coupled to the second connector 780, an audible signal is produced by a second latch 772, located on the second external plug 770, to notify an installer that the coupling is properly completed. As previously mentioned, the second external plug 770 and the second connector 780 are configured so that the second external plug 770 and the second connector 780 are coupled in a single orientation. This ensures that the hot wires 762 and 794, the neutral wires 764 and 795, and the ground wires 766 and 796 are properly electrically coupled to one another.

According to one exemplary embodiment, the first connector 160 is uniquely designed according to the type of first modular electrical wiring device 110 that it is to be coupled to. Similarly, the second connector 780 is uniquely designed according to the type of second modular electrical wiring device 750 that it is to be coupled to. For example, the first modular electrical wiring device 110 includes a receptacle wiring device. Thus, according to one example, the first connector 160 is designed to have horizontally oriented female contacts and the first external plug 150 is designed to have horizontally oriented male contacts. According to one exemplary embodiment, the width of the first external plug 150 is a first width 724 and the width of the first connector 160 also is a first width 724. In the same example, the second modular electrical wiring device 750 includes a switch wiring device. Thus, in one example, the second connector 780 is designed to have vertically oriented female contacts and the second external plug 770 is designed to have vertically oriented male contacts. According to one exemplary embodiment, the width of the second external plug 770 is a second width 774 and the width of the second connector 780 also is a second width 774. In certain exemplary embodiments, the first width 724 and the second width 774 are not the same.

According to the exemplary embodiment provided above, the first connector 160 is coupleable to the first external plug 150, but not the second external plug 770. Similarly, the second connector 780 is coupleable to the second external plug 770, but not the first external plug 150. This feature allows non-skilled electricians to properly complete the trim-out phase without accidentally coupling the modular electrical wiring device 110 and 750 to an improper connector.

According to some of the exemplary embodiments, pig tails are no longer created in the device box, which results in time saving and cost savings. Additionally, some of the exemplary embodiments provide proper assurance that electrical wiring device is properly electrically coupled to the building wires during the trim-out phase and/or subsequent installations of replacement electrical wiring devices. Further, some of the exemplary embodiments allow electrical wiring devices to be replaced safely without a user or homeowner having to turn the power off at the breaker (not shown) because none of the electrical contacts on the external plug, the connector, or the electrical wiring device are exposed. Many homeowners or users are not skilled at selecting the correct breaker or choose not to turn the power off at the breaker.

Although each exemplary embodiment has been described in detail, it is to be construed that any features and modifications that are applicable to one embodiment are also applicable to the other embodiments. Although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. An electrical wiring system, comprising:
   a receptacle wiring device comprising:
      a front cover comprising a plurality of receptacle openings, the receptacle opening configured to provide power to a load;
      a body coupled to the front cover, the body comprising a cavity for housing a plurality of electrical contacts;
      a plurality of electrical contacts disposed within the cavity of the body;
      at least one opening in the body, the opening providing a pathway to the cavity of the body from an exterior of the body;
      at least one electrical wire comprising a first end and a second end, wherein the first end is coupled to at least one of the electrical contacts within the cavity of the body and the wire extends through the opening in the body; and
   an external plug directly coupled to the second end of the at least on electrical wire and electrically coupled to the at least one of the electrical contacts within the cavity; and
   a connector coupled to one or more building electrical wires and removably coupled to the external plug, the building electrical wires transmitting power from a power source, wherein the connector, external plug, and at least a portion of the receptacle wiring device are configured to be disposed within a cavity of a device box.

2. The system of claim 1, wherein the external plug comprises at least one male plug contact and the connector comprises at least one female connector contact.

3. The system of claim 1, wherein the external plug comprises at least one female plug contact and the connector comprises at least one male connector contact.

4. The system of claim 1, wherein the electrical wires have a length ranging from greater than zero inches and less than about six inches.

5. The system of claim 1, wherein the electrical wires comprise a line electrical wire, a load electrical wire, and a ground electrical wire;
wherein the line electrical wire is coupled at one end to a line plug contact and at an opposing end to a device line contact,
wherein the load electrical wire is coupled at one end to a load plug contact and at an opposing end to a device load contact,
wherein the ground electrical wire is coupled at one end to a ground plug contact and at an opposing end to a device ground contact,
wherein the line plug contact, the load plug contact, and the ground plug contact are disposed at the external plug,
wherein the device line contact, the device load contact, and the device ground contact are disposed at the electrical wiring device,
wherein the connector comprises a connector line contact, a connector load contact and a connector ground contact, and
wherein when the connector is physically coupled to the external plug, the connector line contact is electrically coupled to the line plug contact, the connector load contact is electrically coupled to the load plug contact, and the connector ground contact is electrically coupled to the ground plug contact.

6. The system of claim 1, wherein the electrical wires comprise a hot electrical wire, a first traveler electrical wire, a second traveler electrical wire, and a ground electrical wire;
wherein the hot electrical wire is coupled at one end to a hot plug contact and at an opposing end to a device hot contact,
wherein the first traveler electrical wire is coupled at one end to a first traveler plug contact and at an opposing end to a device first traveler contact,
wherein the second traveler electrical wire is coupled at one end to a second traveler plug contact and at an opposing end to a device second traveler contact,
wherein the ground electrical wire is coupled at one end to a ground plug contact and at an opposing end to a device ground contact,
wherein the hot plug contact, the first traveler plug contact, second traveler plug contact, and the ground plug contact are disposed at the external plug,
wherein the device hot contact, the device first traveler contact, the device second traveler contact, and the device ground contact are disposed at the electrical wiring device,
wherein the connector comprises a connector hot contact, a connector first traveler contact, a connector second traveler contact, and a connector ground contact, and
wherein when the connector is physically coupled to the external plug, the connector hot contact is electrically coupled to the hot plug contact, the connector first traveler contact is electrically coupled to the first traveler plug contact, the connector second traveler contact is electrically coupled to the second traveler plug contact, and the connector ground contact is electrically coupled to the ground plug contact.

7. The system of claim 1, wherein the connector comprises a plurality of wire push-in claims disposed within a housing of the connector, each wire push-in clamp configured to slidably receive and hold one of the one or more building wires.

8. The system of claim 1, wherein the external plug comprises:
a rear side comprising at least one aperture, wherein the at least one electrical wire extends through the at least one aperture of the rear side of the external plug; and
an opposing front side, the front side comprising at least three openings, each opening having at least one contact accessible through the opening for electrically coupling the external plug to the connector.

9. The system of claim 1, further comprising the device box, the device box comprising a back wall and a plurality of side walls defining the cavity, wherein the receptacle wiring device is coupled to the device box and wherein the external plug and connector are disposed within the cavity of the device box.

10. The system of claim 1, wherein a signal is generated indicating proper electrical coupling between the external plug and the connector.

11. The system of claim 10, wherein the signal is an audible signal.

12. The system of claim 10, wherein the signal is a visual signal.

13. The system of claim 1, wherein the connector comprises a connector hot contact, a connector neutral contact, and a connector ground contact, the connector hot contact, the connector neutral contact, and the connector ground contact being disposed within the connector, and wherein the building electrical wires comprise a building hot electrical wire, a building neutral electrical wire, and a building ground electrical wire,
wherein the building hot electrical wire is coupled at one end to the connector hot contact,
wherein the building neutral electrical wire is coupled at one end to the connector neutral contact, and
wherein the building ground electrical wire is coupled at one end to the connector ground contact.

14. The system of claim 13, wherein the electrical wires comprise a hot electrical wire, a neutral electrical wire, and a ground electrical wire,
wherein the hot electrical wire is coupled at one end to a hot plug contact and at an opposing end to a device hot contact,
wherein the neutral electrical wire is coupled at one end to a neutral plug contact and at an opposing end to a device neutral contact,
wherein the ground electrical wire is coupled at one end to a ground plug contact and at an opposing end to a device ground contact,
wherein the hot plug contact, the neutral plug contact, and the ground plug contact are disposed at the external plug,
wherein the device hot contact, the device ground contact, and the device ground contact are disposed at the electrical wiring device, and
wherein when the connector is physically coupled to the external plug, the connector hot contact is electrically coupled to the hot plug contact, the connector neutral contact is electrically coupled to the neutral plug contact, and the connector ground contact is electrically coupled to the ground plug contact.

15. The system of claim 14, wherein the connector is coupleable to the external plug in only one orientation.

16. An electrical wiring system, comprising:
a manually adjustable switch wiring device comprising:
a front side comprising a manually adjustable switch, the switch configured to activate and deactivate power to a load;
a body comprising a cavity for housing at least one electrical switch contact;
at least one switch contact disposed within the cavity of the body;
at least one opening in the body, the opening providing a pathway to the cavity of the body from an exterior of the body;
at least one electrical wire comprising a first end and a second end, wherein the first end is coupled to at least one of the electrical switch contacts within the cavity of the body and the wire extends through the opening in the body; and
an external plug directly coupled to the second end of the at least one electrical wire and electrically coupled to the at least one of the electrical switch contacts within the cavity; and
a connector coupled to one or more building electrical wires and removably coupled to the external plug, the building electrical wires transmitting power from a power source, wherein the connector, external plug, and at least a portion of the switch wiring device are configured to be disposed within a cavity of a device box.

17. The system of claim 16, wherein the switch wiring device comprises a four-way switch,
wherein the external plug comprises at least five contacts,
wherein electrical wires comprise a first in electrical wire, a second in electrical wire, a first out electrical wire, a second out electrical wire, and a ground electrical wire;
wherein the first in electrical wire is coupled at one end to a first in plug contact and at an opposing end to a device first in contact,
wherein the second in electrical wire is coupled at one end to a second in plug contact and at an opposing end to a device second in contact,
wherein the first out electrical wire is coupled at one end to a first out plug contact and at an opposing end to a device first out contact,
wherein the second traveler electrical wire is coupled at one end to a second out plug contact and at an opposing end to a device second out contact,
wherein the ground electrical wire is coupled at one end to a ground plug contact and at an opposing end to a device ground contact,
wherein the first in plug contact, second in plug contact, first out plug contact, second out plug contact, and ground plug contact are disposed at the external plug,
wherein the device first in contact, device second in contact, device first out contact, device second out contact, and device ground contact are disposed at the electrical wiring device,
wherein the connector comprises a connector first in contact, a connector second in contact, a connector first out contact, a connector second out contact, and a connector ground contact, and
wherein when the connector is physically coupled to the external plug, the connector first in contact is electrically coupled to the first in plug contact, the connector second in contact is electrically coupled to the second in plug contact, the connector first out contact is electrically coupled to the first out plug contact, the connector second out contact is electrically coupled to the second out plug contact, and the connector ground contact is electrically coupled to the ground plug contact.

18. The system of claim 16, further comprising the device box, the device box comprising:
a back wall; and
a plurality of side walls defining the cavity,
wherein the switch wiring device is coupled to the device box and wherein the external plug and connector are disposed within the cavity of the device box.

19. The system of claim 16, wherein the connector comprises a plurality of wire push-in clamps, each wire push-in clamp configured to slidably receive and hold one of the one or more building wires.

20. The system of claim 16, wherein the external plug comprises a plurality of wire push-in clamps, each wire push-in clamp configured to slidably receive and hold one of the at least one electrical wires wires.

* * * * *

UNITED STATES PATENT AND TRADEMARK OFFICE
CERTIFICATE OF CORRECTION

| | | |
|---|---|---|
| PATENT NO. | : 8,235,748 B2 | Page 1 of 1 |
| APPLICATION NO. | : 12/627487 | |
| DATED | : August 7, 2012 | |
| INVENTOR(S) | : Lacey et al. | |

It is certified that error appears in the above-identified patent and that said Letters Patent is hereby corrected as shown below:

Claim 1, column 14, line 59, "least on electrical wire and electrically coupled to the at" should be changed to -- least one electrical wire and electrically coupled to the at --.

Claim 20, column 18, line 41, "least one electrical wires wires." should be changed to -- least one electrical wires. --.

Signed and Sealed this
Eighteenth Day of September, 2012

David J. Kappos
*Director of the United States Patent and Trademark Office*